US005625001A

United States Patent [19]

Makower et al.

[11] Patent Number: 5,625,001
[45] Date of Patent: Apr. 29, 1997

[54] TOUGHENED POLAR THERMOPLASTICS

[75] Inventors: Samuel J. Makower, Elkins Park; Richard M. Kopchik, Southampton; Wen-Long Liu, Richboro; Alan D. Stein, Yardley, all of Pa.

[73] Assignee: Rohm and Haas Company, Philadelphia, Pa.

[21] Appl. No.: 489,266

[22] Filed: Jun. 9, 1995

Related U.S. Application Data

[63] Continuation of Ser. No. 106,453, Aug. 13, 1993, abandoned, which is a continuation-in-part of Ser. No. 931,760, Aug. 18, 1992, abandoned.

[51] Int. Cl.$^6$ .............................. C08L 25/00; C08L 27/06
[52] U.S. Cl. ..................... 525/78; 525/70; 525/72; 525/83
[58] Field of Search ..................... 525/66, 70, 72, 525/83, 77, 78

[56] References Cited

U.S. PATENT DOCUMENTS

| | | | |
|---|---|---|---|
| 3,796,771 | 3/1974 | Owens et al. | 525/66 |
| 3,808,180 | 4/1974 | Owens | 260/885 |
| 3,985,703 | 10/1976 | Ferry et al. | 525/66 |
| 4,014,842 | 3/1977 | Kosugi et al. | 525/70 |
| 4,128,605 | 12/1978 | Kishida et al. | 525/70 |
| 4,148,846 | 4/1979 | Owens et al. | 525/66 |
| 4,167,505 | 9/1979 | Dunkelberger | 525/66 |
| 4,452,941 | 6/1984 | Kishida et al. | 525/66 |
| 4,460,742 | 7/1984 | Kishida et al. | 525/64 |
| 4,473,679 | 9/1984 | Falk et al. | 524/432 |
| 4,474,927 | 10/1984 | Novak | 525/66 |
| 4,495,324 | 1/1985 | Chacko et al. | 524/504 |
| 4,690,977 | 9/1987 | Hosoi et al. | 525/83 |
| 4,814,373 | 3/1989 | Frankel et al. | 524/460 |
| 4,957,974 | 9/1990 | Illenda et al. | 525/301 |
| 5,066,708 | 11/1991 | Koller et al. | 524/504 |
| 5,183,856 | 2/1993 | Kitigawa et al. | 525/282 |
| 5,183,859 | 2/1993 | Sasaki et al. | 525/309 |

FOREIGN PATENT DOCUMENTS

| | | |
|---|---|---|
| 270865 | 11/1987 | European Pat. Off. . |
| 295562 | 12/1988 | European Pat. Off. . |
| 59247 | 3/1993 | Japan . |

*Primary Examiner*—Ana Woodward
*Attorney, Agent, or Firm*—Roger K. Graham, Patent Agent

[57] ABSTRACT

Acrylic impact modifiers for polar thermoplastics such as poly(methyl methacrylate), polyamides, and poly(vinyl chloride) are prepared from emulsion polymer particles with hard methacrylate-rich domains in a continuous polyacrylate network.

6 Claims, No Drawings

TOUGHENED POLAR THERMOPLASTICS

This application is a continuation of application Ser. No. 08/106,453 filed Aug. 13, 1993 now abandoned, which is a continuation-in-part application of U.S. application Ser. No. 931,760 filed Aug. 18, 1992, now abandoned.

BACKGROUND OF THE INVENTION

1. Field of the Invention

This invention relates to impact modification of thermoplastic polar polymers, such as poly(methacrylates), poly(vinyl chloride), polyamides, such as polycaprolactam, and the like, by a novel impact modifier, based on a multi-stage emulsion-prepared polymer wherein the second-stage polymer is found as domains within the rubbery crosslinked stage.

2. Description of the Prior Art

For more than 25 years, the plastics industry has sought to impact-modify thermoplastic resins. It has been known that impact modifiers based on acrylic rubbers, such as poly(butyl acrylate) offer reasonable toughness and heat stability. It has also been known that best results are observed when the acrylic rubber is crosslinked and also dispersed into relatively small particles within the thermoplastic matrix, and that this has been best accomplished by preparing a core/shell structure, wherein the core is the crosslinked acrylate rubber and the shell is a polymer, such as one based on methyl methacrylate, compatible with the matrix to be modified. The shell has further been modified to incorporate functional groups, such as acid, capable of reacting with certain functional groups in the matrix polymer, such as amine end groups in polyamides.

These efforts have been commercially successful, but the need still exists for improvements in the balance of impact strength, melt flow, and other properties whilst retaining the matrix properties of heat distortion temperature and hardness. The present invention relates to thermoplastic polar polymers modified with acrylic multi-stage impact modifiers for which the structure differs from the conventional core-shell structure which is commonly found in commercial toughened polar polymers.

Little is taught in the prior art relevant to such impact modifiers of high acrylic ester content. Falk et al., U.S. Pat. No. 4,473,679, teach a multi-stage core/shell composition having a rubbery acrylic shell. Novak, U.S. Pat. No. 4,474,927, teaches a multi-stage polymer of an acrylate rubber core and a functionalized acrylate rubber shell, the shell containing acid groups, for modification of polyamides. Peascoe et al, European Patent Application 295,562, teach a crosslinked (meth)acrylate ester rubbery phase and an interpenetrating crosslinked styrenic resin phase useful in compatibilization of certain thermoplastics. Frankel et al., U.S. Pat. No. 4,814,373, herein incorporated by reference, teach elastomeric acrylic gumstocks which have similar structural features to the impact modifiers taught herein, but do not teach the utility of such structures as impact modifiers. Koller et al., U.S. Pat. No. 5,066,708, teach polymers similar to those of Frankel et al. useful as damping compositions in blends with thermosettable non-polar elastomers.

There exist a number of patents and papers which address the morphology which can be obtained in multi-stage emulsion polymerization. In general, these claim either a core/shell structure or an interpenetrating network of the two phases, at least one phase being cross-linked. There has been no showing that the "domain" structure taught herein produces useful impact modifiers. Rather, the core/shell polymers are described as being impact-imparting rubbers encased in a hard shell which enables ease of isolation by spray- drying or coagulation and also compatibility with the matrix to be impact-modified.

Owens, U.S. Pat. No. 3,808,180, herein incorporated by reference, gives an excellent description of emulsifiers, graft-linking monomers, cross-linking monomers, initiators, and the like, useful in making staged (meth)acrylic emulsion polymers, although he does not directly teach the impact modified blends of the present invention.

SUMMARY OF THE PRESENT INVENTION

We have discovered a toughened blend comprising:

(a) 100 parts of one or more polar thermoplastic polymers;

(b) from about 5 to about 80 parts of an impact modifier comprised of at least 50 weight percent of units derived from a $C_2$–$C_8$ alkyl acrylate, such as ethyl acrylate, n-butyl acrylate, n-octyl acrylate, 2-ethylhexyl acrylate and the like, and of at least 10 weight percent of units derived from a $C_1$–$C_4$ alkyl methacrylate, such as methyl methacrylate, ethyl methacrylate, t-butyl methacrylate, and the like; the impact modifier formed from an assemblage of multi-stage cross-linked emulsion-prepared polymer particles, the first stage being a polymer predominately of units derived from one or more $C_2$–$C_8$ alkyl acrylate and containing at least about 2 weight percent to about 10 weight percent of units derived from at least one copolymerizable unsaturated carboxylic acid, such as methacrylic acid, acrylic acid, itaconic acid, acryloxypropionic acid, vinylbenzoic acid, and the like, and from about 0.2 to about 1.0 weight % of units derived from at least one polyfunctional unsaturated monomer, the second-stage polymer being more than 50% of units derived from methyl methacrylate, the second-stage polymer being formed as crosslinked domains within the first polymer stage, the second-stage polymer being less than about 40 parts by weight of the total stages of the emulsion polymer particle, the second-stage polymer being free of units derived from maleimide or its N-substituted derivatives, and the second-stage polymer containing from about 0.5 to less than about 5 weight percent, preferably from about 0.5 to about 2 weight percent, of units derived from at least one polyunsaturated monomer.

A preferred variant of the above blend, for reasons of ease of manufacture and control of the domain structure, relates to the second-stage polymer being formed in the presence of the first-stage polymer without equilibration of the monomers which polymerize to form the second-stage polymer.

We have further discovered molded or extruded articles formed from the above blends.

By polar polymer is meant a polymer which contains other than carbon and hydrogen atoms, preferably oxygen or chlorine. Such atoms may be present as pendant groups, as in poly(vinyl chloride), or poly(methyl methacrylate), combined in a cyclic structure, such as in a polymer containing dimethyl-N-methylglutarimide units, or as part of the polar chain, as in a polyamide or polyester. Preferred as polar polymers are polylvinyl chloride), a poly(alkyl methacrylate), or a polyamide.

In this description polystyrene is a non-polar polymer and the impact modifiers taught herein are ineffective. Surprisingly, they are effective in improving the impact strength of high-impact styrene polymers, which already have large domains of butadiene elastomer incorporated. They are not effective when such high impact polystyrene is further blended with poly(phenylene ethers).

Depending on the nature of the polar polymer, the blend may further contain at least one of filler, plasticizer, antioxidant, anti-ozonant, ultraviolet stabilizer, thermal stabilizer, pigment or dye, as are commonly known to the art. For example, when poly(vinyl chloride) (PVC) is the matrix polymer, thermal stabilizers for the PVC, such as organotin compounds, organolead compounds, barium-cadmium salt combinations, and the like. For polymers processed at high temperatures, such as the polyamides, thermal stabilizers for the impact modifier, such as organophosphites, hindered phenol antioxidants, and the like, may be present.

A preferred blend composition, for a balance of cost, impact performance, and ease of isolation, encompasses those compositions wherein the first-stage polymer is at least 70% by weight of units derived from butyl acrylate, and wherein the second-stage polymer is at least 55% by weight of units derived from methyl methacrylate. For blending with matrix polymers of high polarity, a second-stage of essentially all methyl methacrylate may be preferred. For blending with certain other polymers for control of compatibility with the matrix polymer, such as a matrix of methyl methacrylate/styrene copolymer, or where a higher refractive index for the impact modifier is desired, a blend is preferred wherein the second-stage polymer further is from about 20% to about 45% by weight of units derived front a vinyl aromatic monomer.

Especially when it is desired to have the second-stage polymer rich in methyl methacrylate, it is preferred that the impact modifier containing from about 2 to about 10% by weight of units derived from at least one unsaturated carboxylic acid have the carboxylic acid at least 40% neutralized in the form of an ammonium salt at the time of formation of the second stage.

DETAILED DESCRIPTION OF THE INVENTION AND ITS PREFERRED EMBODIMENT

The essence of the present invention is that multi-stage acrylic polymers which are not core/shell polymers may be useful as impact modifiers for polar thermoplastics. These multi-stage acrylic polymers in emulsion particle form exhibit a domain structure, the second stage methacrylate polymer being small domains within the continuous acrylic ester polymer network. Such novel structures as impact modifiers are unknown to the art. Frankel et al., U.S. Pat. No. 4,814,373, does teach acrylic polymers of such morphology, but with emphasis on high levels of polyfunctional monomer in the second-stage polymerization, with requirement for an equilibration of second-stage monomers within the first acrylic polymer latex prior to initiation of polymerization, and with no teaching of utility as impact modifiers.

In a U.S. application filed on the same date as the present application, with two of the present inventors named on the application, and with assignment of both applications to the same assignee, is disclosed an improved process for preparing such acrylic multi-stage emulsions and the use of polymers isolated from such emulsions as thermoplastic elastomers. That application describes that such acrylic multi-stage polymers with "domain" morphology can preferably be made by an emulsion process which does not involve a deliberate swelling or equilibration step for the monomers of the to-be-formed second polymer within the first-formed polyacrylate latex. This is accomplished by conducting the second-stage polymerization by a batch or gradual-addition process with concomitant polymerization under conditions where no new particles are formed, that is, with an emulsifier level at least near, and preferably, below the critical micelle concentration. Further, the polymerization is optionally accomplished with the use of co-monomers, such as vinyl aromatic monomers, which aromatic monomers are present as a minority of the total second-stage monomer units, and with the requirement of the presence of acid groups, preferably neutralized with a weak base, in the first polymer stage.

The preferred synthesis method employed is close to those known to the art of sequential or staged emulsion polymerization for many years. First, a crosslinked polymer of predominantly butyl acrylate is prepared by known methods, by either batch or gradual addition methods, under conditions where the particle size is controlled and where the amount of emulsifier remains at a low enough level that once particles are established early in the polymerization, no new particles are formed thereafter. A variety of conventional emulsion polymerization initiators may be used; it is preferred to utilize redox initiators so that initiation at lower temperatures may be accomplished, for ease in controlling the polymerization. A variety of emulsifiers known useful in sequential emulsion polymerization may be used; preferred for cleanliness of polymerization is sodium dodecylbenzenesulfonate. Because the latices and monomers contain ester groups, it is preferred to conduct the polymerization at pH no higher than about 8 to avoid hydrolysis. A particle size range of from about 100 nm to about 180 nm is preferred for ease of synthesis, but both larger and smaller particle sizes may be used.

To achieve the domain morphology, less than about 40% by weight of the two-stage polymerization should be the final stage; if more is used, some core/shell structure will be found and the unique properties imparted by the domain structure may be adversely affected.

If the second-stage polymer is below about 55% methyl methacrylate, its properties in blends with polar polymers will be less attractive, as there will be less compatibility between the various stages and the matrix polymer. Contents of up to about 100% methyl methacrylate in the second-stage polymer may be employed, but it becomes difficult to prevent some core/shell formation under the process conditions where equilibration swelling is avoided, unless ammonia-neutralization of the acid is conducted prior to polymerization of the alkyl methacrylate.

The second-stage polymer may further comprise from about 20% to about 45% by weight of units derived from a vinyl aromatic monomer, such as styrene, p-methylstyrene, chlorostyrene, vinyltoluene, and the like. Preferred for cost reasons is styrene.

The impact modified comprises those compositions wherein the first-stage polymer contains from about 2% to about 10% by weight of units derived from at least one unsaturated carboxylic acid. One preferred embodiment comprises the composition wherein the carboxylic acid is at least 40% neutralized in the form of an ammonium salt, by ammonium meaning $NH_4(+)$, $NH_3R(+)$, $NH_2R_2(+)$, or $NHR_3(+)$ where R is an alkyl group. Use of alkali metal salts in the neutralization will produce a polymer useful in imparting impact, but one which is extremely difficult to process because of its very high viscosity, as well as difficult to disperse into the matrix polymer. The ammonium salt is present during the formation of the second-stage polymer and during conventional isolation, but on exposure to heat, ammonia or the amine is devolatilized and the final molded product will contain the copolymerized acid in the free acid form.

The main component of the first-stage polymerization mixture is a $C_2-C_8$ acrylate, preferably butyl acrylate. Copolymers with other vinyl monomers, such as alkyl methacrylates, may be employed, with up to about 20% of the co-monomer. Monomers such as styrene may be present in amounts up to about 20% to raise the refractive index to match that of the second-stage polymer and improve clarity or response to addition of colorant of the final blend.

In the following discussion and claims, the term "a polyfunctional unsaturated monomer" shall refer to either crosslinking monomers or graftlinking monomers, as defined by Owens. Owens specifically defines (column 4, line 72 ff.) cross-linking and graft-linking monomers as "hav(ing) a plurality of addition polymerizable groups." Crosslinking monomers may be chosen from any of those described in Owens. It is preferred that a graft-linker monomer as defined by Owens be present at levels noted above; preferred are diallyl maleate and allyl methacrylate.

It is highly preferred that the second-stage monomers contain at least one graft-linking and/or cross-linking monomer, as described by Owens at the levels of from about 0.2 to about 2.0 weight-percent, based on weight of all second-stage monomers for maintenance of properties of the blend after thermal processing.

Owens taught the presence of hydrophilic monomers in his first-stage polymer for the purpose of controlling water-hazing when the core/shell polymers were used as impact modifiers for methyl methacrylate polymers. In his list of hydrophilic monomers are acrylic and methacrylic acid, but he does not exemplify their use, nor does he conduct or teach conducting his polymerizations under conditions which will neutralize the acid groups to leave carboxylic acid salt units in the first-stage polymer. In the present invention, it is necessary to utilize at least about 2 weight percent of a copolymerizable unsaturated acid, such as acrylic acid, methacrylic acid, itaconic acid, acryloxypropionic acid, and the like, during the polymerization, and then preferably to neutralize these at least partially prior to conducting the second-stage polymerization. Neutralization may be done with such bases as ammonium hydroxide, methylamine, and the like. Neutralization with other bases may be used, including a combination with ammonia neutralization, if the resulting higher processing torque is not a deterrent.

The conditions of the second-stage polymerization require that there be no excess emulsifier to form new polymer particles, that acid groups be present in the first-stage latex, for compositions very rich in methyl methacrylate that these groups be at least partially neutralized prior to initiation of the second- stage monomers, that the second-stage monomer composition be at least 55% methyl methacrylate, and preferably that: there be no deliberate equilibration step of the second-stage monomers in the presence of the first polymer particles prior to initiation. The polymerization may be initiated at room temperature or higher; it may be initiated thermally or with redox initiation; and the second monomers may be added all at once or gradually.

The domains of the second-stage polymer are small, generally of the order of ca. 2 to 50 nanometers, preferably 10 to 30 nanometers, which accounts for the excellent optical properties of the isolated polymers, even if the refractive index of the second-stage domain-forming polymer is not exactly matched to that of the first-stage polymer.

After completion of polymerization, the polymer particles may be blended with appropriate stabilizers against light and heat. Such stabilizers may be added to the polymeric emulsion prior to isolation. Such stabilization is most appropriate for the modification of thermoplastics requiring higher melt temperatures for processing than those required for poly (methyl methacrylate).

The term "assemblage" has been chosen to represent the form in which the impact modifier will be utilized, and on which the physical, chemical, and morphological parameters will be determined. Although a domain structure may be seen in the individual particles, it is much easier to examine an assemblage of particles for such features. The assemblage may be formed by evaporation of the emulsion, with heat if necessary, to form a coherent film, or by coagulation or otherwise de-stabilizing the polymeric emulsion, followed by some application of heat and/or pressure to form a coherent sheet, film, molding, or extrudate.

The confirmation of the desired morphology can be made by either examination of the polymer particles directly, by casting a thin film with minimal heat history and then examining the film, or examining a molded part. The samples can be selectively stained to highlight either acrylate groups or styrenic groups; most effective is the ruthenium staining technique for styrene groups (Trent et al., Macromolecules, 16, 588 (1983)). For examination of particle structure, 10% of the emulsion is combined with a binder emulsion of butyl acrylate 52/methyl methacrylate 46.7/methacrylic acid 1.3 and additional emulsifier (5%), usually sodium lauryl sulfate, is added. Samples are dried to films, cryosectioned, and exposed to ruthenium tetroxide vapors for one hour.

The particles as prepared in emulsion may be isolated in a variety of ways as a dry solid. The particles, particularly those with a low second-stage content, are generally too soft to spray-dry, and a third hard non-crosslinked phase may be polymerized onto the particles, similar to the method described in U.S. Pat. No. 5,066,708, to aid in isolation. Such polymers will be somewhat stiffer and harder. The third polymer is preferably a polymer formed from methacrylate units similar to those used in the second-stage, but no multifunctional monomer is employed. To prevent the third stage polymer from forming within the acrylate polymer, it is preferable to lower the pH, and to use methyl methacrylate homopolymer (or a polymer at least 90 weight percent methyl methacrylate), whose polymer is less likely to form inside the polyacrylate.

Partial agglomeration of the particles, so as to lower the amount of third phase polymer required for coverage, may be carried out prior to formation of the third stage and spray-drying.

A preferred isolation method is coagulation and de-watering. The emulsion may be coagulated by addition of salt, by freezing and thawing, or by addition of water-miscible solvents. "Salt" is not restricted to sodium chloride, but can include many water-soluble materials used in the coagulative art, such as sodium, potassium, calcium, zinc, aluminum or magnesium salts which are soluble, such as nitrates, chlorides, sulfates, phosphates, hypophosphites, and the like.

The wet cake may be dewatered by filtration and drying, preferably with some mechanical operation which wrings water, salts, emulsifier, etc. from the polymer prior to final drying. Equipment used for the coagulation and isolation of synthetic or natural rubber latices can be used for this purpose, such as an Anderson expeller. Continuous coagulation may be used. If a non-compacted powder is wished, the method described above for spray-dried polymer of polymerizing an outer stage of hard polymer may be used, or a staged coagulation method such as taught in Grandzol et al., U.S. Pat. No. 4,463,131, may be used.

An especially preferred method, if the impact modifier is desired in pelletized form, is that of extruder coagulation followed by washing and de-watering in the liquid state. Such an operation is taught in Bortnick, U.S. Pat. No. 3,751,527, incorporated by reference. In this operation, the TPE is recovered as pellets which can readily be processed in final objects. Many coagulants can be used, as taught in Bortnick. A preferred coagulant for acceptable color is calcium hypophosphite, as taught in Hung, U.S. Pat. No. 4,602,083, incorporated by reference.

The impact modifier and/or the final blend may contain additives, such as thermal or oxidative stabilizers, anti-ozonants, dyes, colorants, fillers, lubricants, and the like, especially in used under conditions of exposure to weather. Useful for these purposes are phosphites, such as tris (nonylphenyl) phosphite, sulfur compounds, such as dilauryl thiodipropionate, waxes for lubricating purposes, such as paraffin waxes, substituted phenolic antioxidants, such as octadecyl 3,5-di-t-butyl-4-hydroxyhydrocinnamate, and benzotriazole light stabilizers, such as 2-(2'-hydroxy-5'-methylphenyl)benzotriazole.

The polymers of this invention, whether made by the preferred non-equilibration process or by the equilibration process of Frankel et al., may also be used as damping materials to isolate vibrations, either singly, or in combination with thermosettable elastomers, similar to the methods taught in Koller et al. With suitable formulation, the polymers in latex form formed by the non-equilibration process also may be useful as caulks, mastics, wall coverings, and the like; many such uses for which the acrylic latices are useful are disclosed in Frankel et al. Generally for such uses, it will be preferable to utilize a low level of second-stage polymer and to have the glass temperature of the second-stage polymer not much above room temperature.

EXAMPLE 1

The following example describes the preparation of an impact modifier with a butyl acrylate first-stage and a methyl methacrylate/styrene copolymer second stage. To a suitable reaction vessel equipped with stirrer, means for adding liquids, a reflux, condenser, and a nitrogen sparge line is added 630 parts of water, which is sparged with nitrogen for one hour. Separately are prepared initiator solutions A, B, and C; A is 1% t-butylhydroperoxide in water; B is 1% sodium formaldehyde sulfoxylate in water; C is 1% ferrous sulfate in water. Also separately prepared is an emulsion of water 168 parts, emulsifier (23% sodium dodecylbenzenesulfonate) 16.0 parts, butyl acrylate (BA) 536.4 parts, ethyl acrylate (EA) 144 parts, methacrylic acid (MAA) 18 parts, acrylic acid (AA) 18 parts, diallyl maleate (DA1M) 2.9 parts, and butylene glycol diacrylate (BGDA) 0.7 parts, which stirred emulsion along with 115 parts of rinse water is divided into weighed portions ("shots").

To the water in the reaction vessel is added 2.8 parts of sodium dodecylbenzenesulfonate; the sparge is stopped, 45 parts of the monomer emulsion is added, then 4.3 parts of solution A, then 2.8 parts of solution B, then 0.5 parts of solution C with a 5 part water rinse, then 23 parts rinse water. An exotherm occurs to 31 degrees C.; 15 minutes after the peak of the exotherm is added 90 parts of the monomer emulsion and 23 parts of rinse water, then is added 8.6 parts solution A and 5.4 parts solution B. An exotherm occurs to 43 degrees C.; 15 minutes after the peak of the exotherm is added 180 parts of the monomer emulsion and 23 parts of rinse, followed by 17.1 parts solution A and 10.8 parts solution B. An exotherm occurs to 57 degrees C. Ten minutes after the peak of the exotherm, is added 360 parts of the monomer emulsion and 23 parts rinse, followed by 34.2 parts of solution A and 22.5 parts solution B. An exotherm occurs to 75 degrees; 15 minutes after the peak of the exotherm, the reaction is cooled to 50 degrees C., and then is added 229 parts of the monomer emulsion and 23 parts of rinse, then 20.7 parts solution A and 14.5 parts solution B. Fifteen minutes after the final exotherm is added 0.13 parts of t-butylhydroperoxide in 10 parts water and 0.09 parts of sodium formaldehyde sulfoxylate in 10 parts of water; no further exotherm is seen.

Separately is prepared an emulsion of 23 parts water, 2 parts sodium dodecylbenzenesulfonate, 54 parts styrene (St), 124.2 parts methyl methacrylate (MMA), 1.26 parts divinylbenzene (DVB), and 0.54 parts butylene glycol diacrylate. The first-stage emulsion is heated to 85 degrees C., and the second monomer emulsion mix is added over 30 minutes. At the same starting time an initiator solution of sodium persulfate (0.9 parts) in 36 parts water is added over 35 minutes. The reaction mixture is stirred 15 minutes longer at 85 degrees C., and then is "chased" twice in the same manner as in Stage 1. The emulsion is cooled and filtered through cheesecloth to remove any gels.

EXAMPLE 2

The following example describes the preparation of a similar impact modifier as in Example 1, but where the first-stage acid-containing polymer is neutralized prior to conducting the second-stage polymerization. The first-stage polymerization is conducted as in Example 1. Diluted (ca. 14%) ammonia is added dropwise with stirring of the emulsion until the pH reached 7.4. The emulsion is then heated to 85 degrees C., and the second-stage reaction conducted as in Example 1.

There are several means by which isolation from the emulsion may be accomplished. In one mode, a portion of one of the emulsion is isolated by freezing in a Dry-Ice/acetone batch, thawing, and filtering, followed by vacuum-oven drying at 60 degrees C. In another mode, the emulsions may be isolated by coagulation as disclosed in the Hung reference in a 0.8 inch (20.3 min.) Welding Extruder contra-rotating non-intermeshing twin-screw extruder, except that the coagulation is accomplished in a single-screw extruder which then feeds the coagulated polymer and aqueous medium into the dewatering zone. The coagulant is calcium hypophosphite/acetic acid (6/10 by weight), total amount 1% percent on latex solids. After removal of water and any volatile residuals, stabilizers are added prior to extrusion into pellets, such as tris(nonylphenyl) phosphite, dilauryl thiodipropionate, hydroxybenzotriazoles, etc.

EXAMPLE 3

The following example describes the preparation of a variant of Examples 1 and 2, where the first-stage acid-containing polymer contains only methacrylic acid, which acid groups are neutralized prior to conducting the second-stage polymerization, and where the second-stage monomer addition is conducted in two parts. The first-stage polymerization is conducted as in Example 1, but with the acrylic acid replaced with an equivalent amount of methacrylic acid. Diluted (ca. 14%) ammonia is added dropwise with stirring of the emulsion until the pH reached 7.4. The emulsion is then heated to 85 degrees C., and the second-stage reaction conducted by gradual addition as in Example 1.

The polymer of Example 3 is isolated by coagulation in a 0.8 inch diameter (203 mm.) contra-rotating tangential twin-screw extruder.

EXAMPLE 4

The polymer of Example 3 in latex form is examined by transmission electron microscopy (Hitachi H-7000 STEM at 100 KeV accelerating voltage). At 100,000× magnification, the emulsion particles within the binder clearly show interpenetration of the polyacrylate first stage by domains of the second, styrene-containing polymer, with domain sizes of the second polymer between 20 to 30 nanometers, the particle size of the latex polymer particles being about 150 nm. Some of the second-stage polymer forms a shell at the surface of the particle.

The morphology of extruded pellets and of molded parts are similar, showing a continuous structure of the acrylate first-stage polymer (resulting from the thermal history of the processing steps, which eliminates the individual latex polymer structure), and domains of the styrene-containing second stage polymer.

The polymers of Examples 1 and 2 upon similar microscopic examination show a similar structure, wherein the second-stage polymer is located as separate domains primarily within the continuous stage of the first-stage polymer.

EXAMPLE 5

In this Example, various weights of the polymer of Example 3 are blended with an "acrylic molding powder", which is a 87/13 methyl methacrylate/ethyl acrylate copolymer of weight-average MW ca. 110,000, by melt-mixing and extruding as pellets from a 0.8" (20.3 mm.) single-screw extruder operated at 100 rpm. (In all examples herein, values for single screw extruder are reported as Zone-1/Zone-2/Zone-3/Die-1/Die-2//die pressure (kPa)//melt temperature in degrees C. Here the values are 171/174/177/177/177 degrees C. After drying at 50 degrees C. in vacuo overnight, the pellets are injected molded on an Arburg molder at a pressure of about 800 psi (550 kPa) at ca. 180 degrees C. melt temperature, and a mold temperature (ASTM mold) of ca. 100 degrees C. Tensile properties are measured on a Zwick tester. The control is a commercial toughened clear acrylic molding powder, based on a butyl acrylate/styrene//methyl methacrylate heteropolymer at ca. 40% in poly(methyl methacrylate).

| % Impact Modifier in Blend | Hardness Shore D | Tensile strength max., mPa | Notched Izod, J/m. | |
|---|---|---|---|---|
| | | | 23° C. | 0° C. |
| Control | 86 | 45.5 | 42.7 | 26.7 |
| 35% | 77 | 36.5 | 58.7 | 37.4 |
| 40% | 75 | 33.8 | 69.4 | 53.4 |
| 45% | 72 | 28.2 | 90.7 | 74.7 |

The values seen are indicative of improved impact strength, but with a loss in hardness and tensile strength. The samples are translucent, as the impact modifier is not tailored for a refractive index match with the MMA/EA matrix.

EXAMPLES 6–8

Polymers are prepared as in Example 5, which give on molding similar physical properties to that of Example 5. In Example 6, all of the butylene glycol diacrylate is removed from both stages; further, the second-stage is split into two portions, all the divinylbenzene being in the first feed, and n-dodecyl mercaptan (×% on monomer) being added in the second feed. Example 7 uses 10-times the amount of mercaptan, but otherwise repeats Example 6. In Example 8, there is no butylene glycol diacrylate in either stage; it is replaced by allyl methacrylate in the second stage. Such polymers will be effective impact modifiers for methyl methacrylate and for poly(vinyl chloride).

EXAMPLE 9

A polymer of the composition BA/EA/MAA/DALM/BGDA//MMA/ St/DVB/BGDA=80 (74.5/20/5/0.4/0.1//20 (69/30/0.7/0.3) is prepared in a manner similar to that of Example 1, that is, with no neutralization until completion of the second-stage polymerization, no mercaptan, no equilibration period before polymerization of the second-stage monomers, and gradual addition of the second-stage monomers; however, no acrylic acid is employed. Five shots of activator (B) and catalyst (A) are employed in the first-stage polymerization.

The polymer is isolated, molded and tested as in Example 5, and similar results in modification of poly(methyl methacrylate) will be obtained.

In a similar manner, except for neutralization, the second stage styrene of Example 9 may be replaced with methyl methacrylate, so that the second-stage polymer is essentially all methyl methacrylate. The resulting polymer, after similar isolation, will be an effective impact modifier for the polar polymers taught herein.

EXAMPLE 10

The polymer of Example 9 is blended with a commercial high-impact polystyrene, whose exact rubber content is unknown; it is sold by Amoco Chemicals as Amoco H4R. Dry blends of the two polymers are made and the mixture melt-blended and pelletized in a 0.8 inch (20.3 mm.) single-screw extruder, at conditions 168/171/171/177/177 degrees C. The polymer is molded on a Arburg injection molding machine into ASTM plaques at conditions nozzle/zone-3/zone-2/zone-1=185/190/195/190 degrees C. injection pressure 5510 kPa, back pressure 345 kPa, mold temperature 38 degrees C., pieces from which are tested by Dynatup falling dart (ASTM 4272) and Izod (ASTM 256) impact methods. Blend compositions are reported in phr=parts of additive per 100 parts of the matrix polymer. All results are in (ft.lbs//Joules) or (ft.lbs./in.//Joules/m.) All Izod breaks are clean, not hinged. The improvement is especially noted in the unnotched or drop tests.

| Blend | Dyna-Tup | Izod notched | Izod unnotched |
|---|---|---|---|
| Control | 1.8//2.43 | 1.41//75.2 | 22.2//1185 |
| 10 phr | 5.5//7.48 | 1.33//71.0 | 29.2//1560 |
| 20 phr | 6.0//8.18 | 1.47//78.5 | 33.5//1788 |
| 30 phr | 6.9//9.42 | 1.45//77.4 | Buckled |

EXAMPLE 11

The polymer of Example 9 is blended with a commercial poly(vinyl chloride of K value 51; the formulation used is PVC 100 parts/organotin stabilizer 2 parts/ester lubricant 2.7 parts/wax 0.3 parts/high molecular weight poly(methacrylate) processing aid 1 part. Dry blends of the two polymers are made and the mixture melt-blended and pelletized in a 0.8 inch (20.3 mm.) single-screw extruder at conditions 166/166/171/177/177 degrees C. The polymer is molded on a Arburg injection molding machine into ASTM plaques at conditions nozzle/zone-3/zone-2/zone-1=175/175/170/150 degrees C. injection pressure 5860 kPa, back pressure 2400 kPa, mold temperature 32 degrees C.,into plaques for impact testing. Blend compositions are reported in phr=parts of additive per 100 parts of the matrix polymer. All results are in (ft. lbs//Joules) or (ft.lbs./in.//Joules/m.) All Izod breaks for the modified notched samples are hinged, not clean; the unnotched samples with impact modifier buckled but did not break. The unmodified unnotched sample show both brittle and clean breaks; the values in parentheses are for the one clean break of the five samples tested. As is known for core/shell modifiers, 30 phr of impact modifier may be an excessive amount and impact strength will not further improve over about 20 phr.

| Blend | Dyna-Tup | Izod notched | Izod unnotched |
|---|---|---|---|
| Control | 7.35//10 | 0.42//22.4 | 50.71(9.45)//2707(504) |
| 20 phr | 41.93//67 | 20.64//1101 | buckled |
| 30 phr | 35.31//48 | 20.84//1112 | buckled |

EXAMPLE 12

The polymer of Example 9 is blended with a commercial polycaprolactam, MW ca. 18,000. Dry blends of the two polymers are made and the mixture melt-blended and pelletized in a 0.8 inch (20.3 min.) single-screw extruder at conditions 227/227/238/238/232 degrees C. The polymer is molded on a Arburg injection molding machine into ASTM plaques at conditions nozzle/zone-3/zone-2/zone-1=270/255/270/270 degrees C., injection pressure 3030 kPa, back pressure 345 kPa, mold temperature 60 degrees C., into pieces from which are tested by Dynatup and Izod impact methods. Blend compositions are reported in phr=parts of additive per 100 parts of the matrix polymer. All results are in (ft. lbs//Joules) or (ft.lbs./in.//Joules/m.) All notched Izod breaks are clean until 30 phr of modifier (Example 9 only) is used, when the sample exhibited hinged impact behavior. All unnotched samples buckled on testing.

| Blend | Izod notched Example 9 Modifier | Izod notched Example 1 Modifier |
|---|---|---|
| Control | 1.91//102 | 1.91//102 |
| 10 phr | 2.95//157 | 2.49//133 |
| 20 phr | 4.12//220 | 3.21//171 |
| 30 phr | 15.95//851 | 4.25//227 |

We claim:

1. A toughened blend comprising:

(a) 100 parts of poly(vinyl chloride), and (b) from about 5 to about 80 parts of an impact modifier comprised of at least 50 weight percent of units derived from a $C_2$–$C_8$ alkyl acrylate and of at least 10 weight percent of units derived from a $C_1$–$C_4$ alkyl methacrylate, the impact modifier formed from an assemblage of multi-stage cross-linked emulsion-prepared polymer particles, the first stage being a polymer predominately of units derived from one or more $C_2$–$C_8$ alkyl acrylates and containing at least about 2 weight percent to about 10 weight percent of units derived from a copolymerizable monounsaturated carboxylic acid, the carboxylic acid being at least 40 % neutralized in the form of an ammonium salt at the time of formation of the second stage, and from about 0.2 to about 1.0 weight % of units derived from at least one unsaturated monomer having a plurality of addition polymerizable unsaturated groups, the second-stage polymer being formed in the presence of the first-stage polymer, the second-stage polymer being more than 50% of units derived from methyl methacrylate, the second-stage polymer being formed as cross-linked domains within the first polymer stage, the second-stage polymer being less than about 40 parts by weight of the total stages of the emulsion polymer particle, the second-stage polymer being free of units derived from maleimide or its N-substituted derivatives, and the second-stage polymer containing from about 0.5 to less than about 5 weight percent of units derived from at least one unsaturated monomer having a plurality of addition polymerizable unsaturated groups.

2. The blend of claim 1 wherein the second-stage polymer contains from about 0.5 to about 2.0 weight % of units derived from a unsaturated monomer having a plurality of addition polymerizable unsaturated groups.

3. The blend of claim 1 wherein the impact modifier additionally contains a third-stage polymer, the third-stage polymer containing no units derived from a polyunsaturated monomer having a plurality of addition polymerizable unsaturated groups and containing at least about 90 weight percent of units derived from methyl methacrylate.

4. A molded or extruded article formed from the blend of claim 1.

5. A molded or extruded article formed from the blend of claim 2.

6. A molded or extruded article formed from the blend of claim 3.

* * * * *